(12) United States Patent
Schneider et al.

(10) Patent No.: US 8,956,067 B2
(45) Date of Patent: Feb. 17, 2015

(54) SPLIT CASE OF A MAGNETIC COUPLING, IN PARTICULAR OF A MAGNETIC COUPLING PUMP

(75) Inventors: Günther Schneider, Herne (DE); Michael Westib, Bochum (DE); Dirk Koep, Herten (DE)

(73) Assignee: Ruhrpumpen GmbH, Witten (DE)

( * ) Notice: Subject to any disclaimer, the term of this patent is extended or adjusted under 35 U.S.C. 154(b) by 0 days.

(21) Appl. No.: 14/004,357

(22) PCT Filed: Mar. 1, 2012

(86) PCT No.: PCT/DE2012/000206
§ 371 (c)(1),
(2), (4) Date: Sep. 10, 2013

(87) PCT Pub. No.: WO2012/122963
PCT Pub. Date: Sep. 20, 2012

(65) Prior Publication Data
US 2014/0001004 A1    Jan. 2, 2014

(30) Foreign Application Priority Data
Mar. 11, 2011  (DE) .......................... 10 2011 013 829

(51) Int. Cl.
F16D 1/033    (2006.01)
H02K 49/10   (2006.01)
F04D 29/62    (2006.01)
F04D 13/02    (2006.01)

(52) U.S. Cl.
CPC .............. H02K 49/10 (2013.01); F04D 29/628 (2013.01); H02K 49/106 (2013.01); F04D 13/025 (2013.01)
USPC ............................................ 403/28; 403/337

(58) Field of Classification Search
USPC ........ 464/29, 182, 170; 403/28–30, 335–337; 310/104; 417/420; 277/918; 285/905
See application file for complete search history.

(56) References Cited

U.S. PATENT DOCUMENTS

| 3,270,910 A | | 9/1966 | Lusk |
| 3,311,392 A | * | 3/1967 | Buschow .................. 403/336 X |
| 3,490,379 A | * | 1/1970 | Nikolaus ....................... 417/420 |
| 4,844,707 A | | 7/1989 | Kletschka |
| 5,090,944 A | * | 2/1992 | Kyo et al. ....................... 464/29 |

(Continued)

FOREIGN PATENT DOCUMENTS

| DE | 523 688 C1 * | 4/1931 | .................... 403/337 |
| DE | 809 979 | 8/1951 | |

(Continued)

OTHER PUBLICATIONS

International Search Report issued by the European Patent Office in International Application PCT/DE2012/000206 on Oct. 16, 2012.

*Primary Examiner* — Gregory Binda
(74) *Attorney, Agent, or Firm* — Henry M. Feieréisen LLC

(57) ABSTRACT

A magnetic coupling includes an inner rotor and an outer rotor between which a split case is disposed. The split case has a flange which can be fixed with a counter-flange on a coupling component. The split case is made of a ceramic, whereas the coupling component and the counter-flange are formed from a metal material. Provided on the flange is a spherical elevation which engages in a corresponding, spherical indentation. A compensating element is arranged between the flange and the counter-flange and can have a spherical indentation corresponding to the spherical elevation on one of its front sides.

13 Claims, 5 Drawing Sheets

(56) References Cited

U.S. PATENT DOCUMENTS

| | | | |
|---|---|---|---|
| 5,451,116 A * | 9/1995 | Czachor et al. | 403/28 X |
| 7,581,765 B2 * | 9/2009 | Minford | 285/905 |
| 2008/0122050 A1 | 5/2008 | Ikeda et al. | |
| 2011/0234035 A1 | 9/2011 | Wittschier | |

FOREIGN PATENT DOCUMENTS

| | | | |
|---|---|---|---|
| DE | 1 792 439 | 7/1959 | |
| DE | 35 42 337 | 4/1987 | |
| DE | 102006021245 | 10/2007 | |
| DE | 102006056819 | 6/2008 | |
| DE | 102009022916 | 12/2010 | |
| EP | 1 188 970 | 3/2002 | |
| FR | 923196 | 6/1947 | |
| JP | 2006-32888 | 2/2006 | |
| SE | 67611 C1 * | 7/1929 | 403/337 |
| WO | WO 2010/136019 | 12/2010 | |

* cited by examiner

SPLIT CASE OF A MAGNETIC COUPLING, IN PARTICULAR OF A MAGNETIC COUPLING PUMP

CROSS-REFERENCES TO RELATED APPLICATIONS

This application is the U.S. National Stage of international Application No. PCT/DE2012/000206, filed Mar. 1, 2012, which designated the United States and has been published as International Publication No. WO 2012/122963 and which claims the priority of German Patent Application, Serial No. 10 2011 013 829.3, filed Mar. 11, 2011, pursuant to 35 U.S.C. 119(a)-(d).

BACKGROUND OF THE INVENTION

The invention relates to a magnetic coupling, in particular a magnetic coupling pump comprising an inner rotor and an outer rotor, which each carry magnets between which a split case is disposed, which has a flange, which flange can preferably be fixed with a counter-flange on a coupling component, preferably on a casing cover.

Magnetic coupling pumps are generally known and described, for example, in DE 10 2009 022 916 A1. In this case, the pump power is transmitted from a drive shaft via a magnet-carrying rotor (outer rotor) in a contact-free manner and substantially free from slippage onto the pump-side magnet carrier (inner rotor). The inner rotor drives the pump shaft which is mounted in a sliding bearing lubricated by the conveying medium, i.e. in a hydrodynamic sliding bearing. Located between the outer rotor and the inner rotor, i.e. between the outer and the inner magnets is the split case with its cylindrical wall. The split case is connected with its flange to a pump component, for example, a casing cover and has a closed base opposite thereto. The split case, i.e. the magnetic coupling pump reliably separates the product case from the environment so that the risk of an escape of product with all the associated negative consequences can be eliminated. A magnetic coupling pump is accordingly the combination of a conventional pump hydraulics with a magnetic drive system. This system uses the attraction and repulsion forces between magnets in both coupling halves for the contact-free and slippage-free transmission of torque. The magnetic coupling pump accordingly has major advantages particularly when handling very valuable or very hazardous substances.

Split cases can consist of different materials such as, for example, of metals having most diverse alloy compositions. Split cases made of metal disadvantageously cause eddy current losses, whereas plastic split cases have only limited temperature and/or pressure resistance, which is particularly disadvantageous at high medium temperatures and/or high pump pressures. In this respect, ceramic split cases have proved successful in practice, with split cases made of glass also becoming known recently (DE 10 2009 022 916 A1).

The split case is connected via its flange to the pump component or to the coupling component, for example, screwed and thus forms a sealed connection, possibly with a seal (O-ring) interposed. The pump component and also the counter-flange consist of a metal material which each have different material properties to the ceramic of the split case, where for example mention should be made of different (thermal) expansion coefficients. In this respect, tensions can occur under thermal stressing of the metal-ceramic connection, where the metal connection partners expand more than the ceramic connection partners. These expansions are passed into the originally tight contact surface between the flange and the pump component so that the originally sealed connection can have leaks since the seal provided (O ring) is as it were relaxed. For example, an edge loading can occur where the metal component presses into the ceramic flange and can thus destroy this (incipient cracking). However extreme caution is also required during assembly, i.e. when screwing the split case onto the pump component since the ceramic of the split case reacts very sensitively to unfavourable stress transitions or stress peaks, i.e. to nonuniform tightening of the screws and can also be destroyed.

SUMMARY OF THE INVENTION

It is the object of the invention to provide a magnetic coupling, in particular a magnetic coupling pump of the type mentioned initially in which by simple means a continuous connection can be achieved between dissimilar connection partners, i.e. for example, between the split case and metal connection partners even under thermal loading and/or under pressure loading, where in addition assembly should also be made easier.

According to the invention, the object is solved by a magnetic coupling, in particular by a magnetic coupling pump having a split case, which has a flange, which flange can preferably be fixed with a counter-flange on a coupling component, wherein the flange at least on its fastening side oriented towards the counter-flange has an elevation which engages in a correspondingly adapted indentation.

It should be pointed out that the features listed individually in the claims can be combined with one another in any technically meaningful manner and show further embodiments of the invention. The description additionally characterizes and specifies the invention in particular in connection with the figures.

According to the invention, a magnetic coupling, in particular a magnetic coupling pump is provided comprising a split case, which has a flange, which flange can preferably be fixed with a counter-flange on a coupling component. It is expedient that the flange has an elevation at least on its fastening side oriented towards the counter-flange, which engages in a correspondingly adapted indentation.

It is favourable if the elevation, when viewed in cross-section, is rounded on its surface oriented towards the indentation, preferably spherical, i.e. designed to be quasi-spherical segment shaped. As a result of the spherical configuration of the elevation or as a result of the quasi-spherical segment-like configuration of the surface oriented towards the indentation, it is advantageously achieved that under mechanical pre-stressing the split case-coupling component connection and/or under thermal expansion of the metal component, e.g. an edge loading on the flange, i.e. for example an incipient cracking of the flange which could lead to leakage is avoided. Instead, harmful stress transitions and/or stress peaks are avoided. In addition, under thermal stressing or under compressive stressing, it is advantageously achieved that a quasi-centred mounting position is always ensured through the spherical-segment-like abutment of the flange in the corresponding indentation. In particular, the dissimilar connection of the metal and ceramic connection partners is easier to make (tightening of the screws) since the spherical configuration enables uniform stress transitions. In this respect, the connection partners are as it were strengthened by simple means due to the spherical configuration of the elevation and the indentation, where a punctuate or linear loading is always avoided, where instead a uniform surface loading produced over the spherical surface is achieved._

It is possible that the split case is formed from a sintered ceramic (e.g. zirconium oxide $ZrO_2$). Expediently the elevation is then sintered into the fastening side of the flange, i.e. produced in one piece with the split case or with the flange.

It is expedient if the counter-flange is designed as a spherical-profile ring, which can be connected, preferably can be screwed, non-positively and positively, to the said component. It is favourable if the counter-flange has the spherical indentation corresponding to the spherical surface of elevation. The counter-flange preferably consists of a metallic material, for example, of a stainless steel. The counter-flange can also be designated as collar flange. The indentation can be incorporated, for example, during manufacture of the counter-flange or moulded in subsequently.

It is possible to connect the flange to the pump component or to the coupling component without using a counter-flange. In this case, a screw hole can be provided in the flange through which a screw can be screwed directly to the said component. Expediently the elevation or the spherical-segment-like surface can then be sintered directly into the contact surface of the flange to the component, where the corresponding indentation is disposed in the said component.

Naturally it is completely within the sense of the invention to provide the indentation on the fastening side of the flange, where the elevation would be disposed on the counter-flange or on the said component.

However, the solution of the object is also achieved with a magnetic coupling, in particular with a magnetic coupling pump comprising an inner rotor and an outer rotor, between which a split case is disposed which has a flange, which flange can be fixed with a counter-flange on a coupling component, where a compensating element is disposed between the flange and a counter-flange, which has concentric grooves, i.e. material recesses, on at least one longitudinal side. It is preferred if an equatorial concentric groove is incorporated starting from the inner circumference in the direction of the outer circumference on the first longitudinal side. Preferably equatorial concentric grooves starting from the outer circumference in the direction of the inner circumference are incorporated on a second longitudinal side opposite to the first longitudinal side. Concentric grooves in the sense of the invention are therefore material recesses which are guided from an outer circumference in the direction of an inner circumference or from an inner circumference in the direction of an outer circumference without being continuous. If the concentric grooves are disposed with their central axis perpendicular to a flat surface, this is an equatorial concentric groove in the sense of the invention. Naturally the concentric grooves can also be provided with their central axis at an angle to the flat surface.

It is favourable if the at least first longitudinal side has respectively one concentric groove in a front side region, where there is a central section between the concentric grooves in which a material recess is disposed on the second longitudinal side opposite the said first longitudinal side. Thus, as it were, a wave-like compensating element is provided which, for example, has two concentric grooves or material recesses on its first longitudinal side and one material recess or concentric groove on its second longitudinal side. Naturally this exemplary embodiment should not be restrictive. It is feasible to adapt the number of concentric grooves and material recesses to the respective situation, i.e. to the operating situation to be expected, e.g. with regard to the thermal loading and/or pressure loading to be expected.

It is expedient if the concentric grooves disposed in the front-side region are for example, slot-like having a preferably rounded slot base. The material recess disposed on the second longitudinal side can be U-shaped when viewed in cross-section having a base web and two U legs disposed at an angle thereto, where the U legs can be disposed perpendicular to the base. It can preferably be provided that the U legs are disposed oriented away from one another at an obtuse angle to the base, so that a material recess expanding conically from the base web is formed. Naturally the geometrical configuration of the concentric grooves and material recesses mentioned as an example should not be restrictive.

The second longitudinal side is preferably oriented towards the wall of the split case.

The compensating element can abut with its front sides flat on the one hand against the fastening side of the flange and on the other hand against the corresponding inner side of the counter-flange. As a result of the particular wave-like geometrical configuration of the compensating element, an expansion compensating element is thus provided which preferably brings about a thermal compensation for expansion which can however also compensate a pressure loading. This means inter alia that the compensating element compensates for the expansion difference when the metallic connection partners expand more under thermal loading than the ceramic connection partners so that the contact surface between flange and coupling component or pump component always remains sealed, the seal is therefore not relaxed. As a result of the compensating element, the mounted pre-defined stress is also maintained during thermal expansion of the metallic partners but can also be maintained under pressure loading.

In a particularly preferred configuration it can be provided to execute the compensating element on at least one of its front sides with a spherical indentation designed for the said spherical configuration of the fastening side. The spherical elevation can therefore engage in the corresponding spherical indentation so that stress peaks and the like are avoided.

It is expedient if both front sides have a spherical configuration. In this case, both front sides can each have an indentation or an elevation. However it is also possible for one of the front sides to have an indentation and the other to have an elevation. If one front side is designed with an elevation and the other with an indentation, the installation position is pre-defined which can facilitate assembly. Preferably the installation position can be predefined so that the longitudinal side of the compensating element with the slot-like concentric grooves, i.e. the first longitudinal side, is oriented towards the counter-flange. Naturally a corresponding indentation and/or elevation corresponding to the selected configuration should be provided on the flange or counter-flange.

A configuration having spherical elevations and/or indentations disposed on both sides of the compensating element is particularly preferred since a particularly easy centring and pre-stressing can thus be achieved.

Naturally, sealing elements can also be provided in the different embodiments which sealing element can be disposed between the coupling component and the flange. The sealing element can be an O-ring or a flat seal which can be inserted in a sealing groove on the flange or the coupling component (pump component/casing cover).

It is advantageous that, as it were, a spherical clamping strip is preferably formed on the fastening side of the flange, which is sintered into the split case flange. The split case flange is held down with the counter-flange, i.e. with the spherical-profile metal ring, where the mechanically effected compensation for expansion (stress compensation) is taken over by means of the spherical configuration. The invention basically starts from product or operating temperatures of up to 100° C. Here it is sufficient in the sense of the invention that no thermally dependent compensation must be provided. Naturally however product or operating temperature of more than 100° C. can exist. In this respect it is favourable if a pre-tensioning element, i.e. the compensating element is additionally provided, which has the spherical indentations on its front side or sides where the pre-tensioning element or the compensating element then takes over the compensation for expansion under thermal conditions where the indentations disposed on the front side of the compensating element in cooperation with the elevations on the flange and counter-flange provide a uniform surface loading produced over the spherical surface.

Naturally the preferably spherical elevation or indentation in the circumferential direction of the flange can be continuous so that as it were a circumferential spherical rib is formed. However, it is also feasible to have a gap in the elevation/indentation when viewed in the circumferential direction so that individual elevations/indentations are spaced apart from one another in the circumferential direction. It is possible to provide one, two or more elevations/indentations which however could each be spaced at the same distance from one another. The same applies to the corresponding elevations/indentations. In a preferred embodiment the compensating element is annular, i.e. continuous in the circumferential direction.

A constant connection is thus ensured with the invention, preferably with a pre-stressing of all the components involved, which can be predefined or pre-determined to the respective assembly requirements. In particular, the spherical construction (elevation/indentation) avoids any edge loading at the flange of the ceramic split case which edge loading leads to an incipient cracking of the flange and to a leakage of the pump/coupling in conventional designs. Furthermore with the spherical geometry (elevation/indentation), the attraction forces are distributed uniformly on the split case flange, avoiding harmful stress transitions and stress peaks on the flange.

Naturally the invention should not be restricted to the example of a magnetic coupling pump. On the contrary, the invention, i.e. the spherical configuration of the elevation and indentation is also feasible with the compensating element in all material connections such as, for example, ceramic-metal; ceramic-ceramic, plastic-plastic, plastic-ceramic and/or plastic-metal connections.

BRIEF DESCRIPTION OF THE DRAWING

Further advantageous embodiments of the invention are disclosed in the subclaims and the following description of the figures. In the figures FIG. 1a shows an enlarged detailed view of an area encircled in FIG. 1 of the split case;

FIG. 2a shows an enlarged detailed view of an area encircled in FIG. 2 of the split case;

DETAILED DESCRIPTION OF PREFERRED EMBODIMENTS

In the different figures the same parts are always provided with the same reference numbers which is why these are usually only described once.

Figure 1:
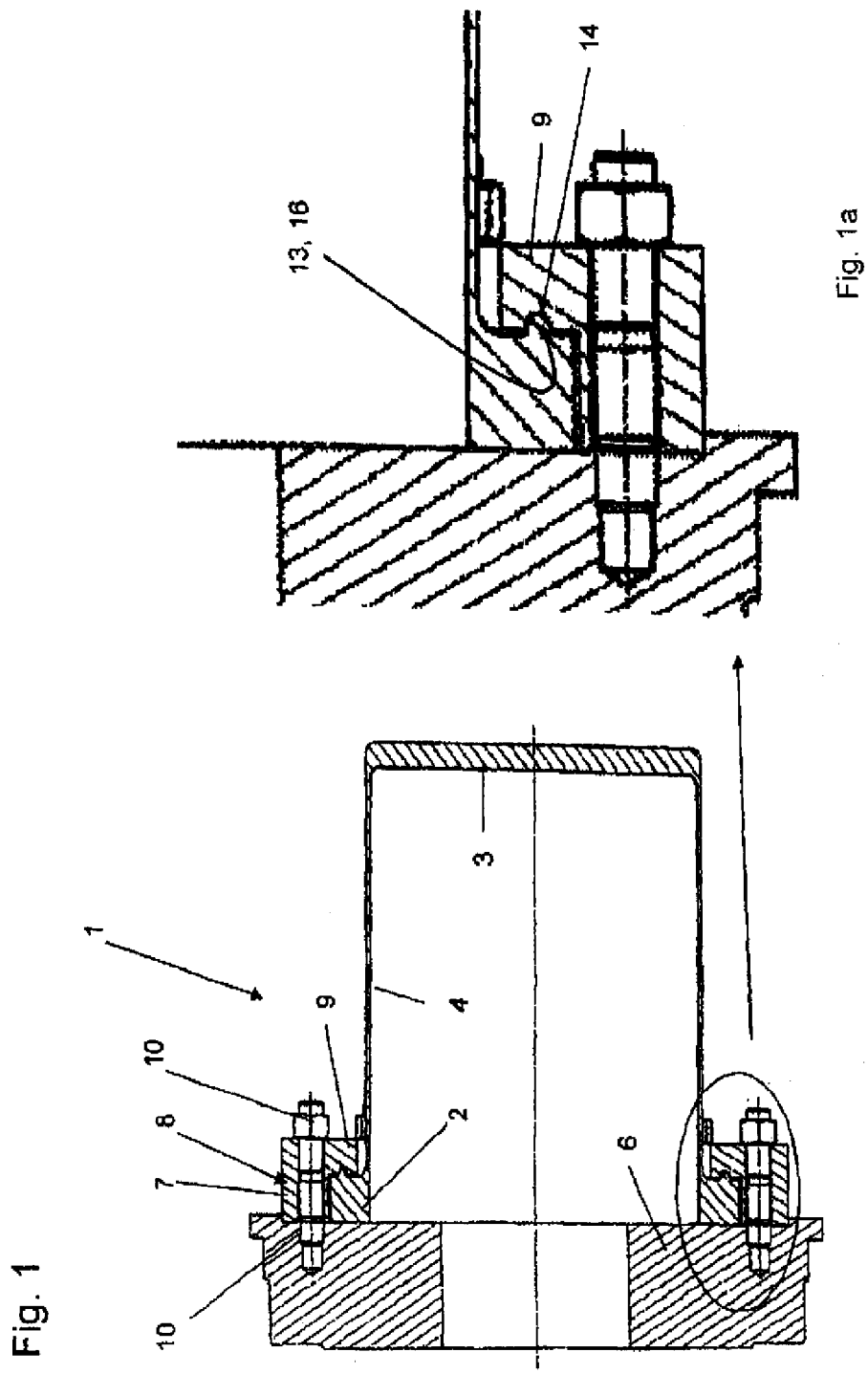
FIG. 1 shows a split case with a spherical elevation on its flange and a corresponding indentation on the counter-flange.

FIG. 1 shows a split case 1, e.g. of a magnetic coupling, for example a magnetic coupling pump. Such an exemplary magnetic coupling pump for example comprises an inner rotor and an outer rotor, which each comprise magnets. The split case 1 has a flange 2 and a base 3 opposite thereto. A substantially cylindrical wall 4 extends between the base 3 and the flange 2. The wall 4 is disposed between the magnets of the inner rotor and the outer rotor, where an air gap is provided. In the magnetic coupling pump the pump power is transmitted from a drive shaft via a magnet-carrying rotor (outer rotor) in a contact-free manner and substantially free from slippage onto the pump-side magnet carrier (inner rotor). The inner rotor drives the pump shaft which is mounted in a sliding bearing lubricated by the conveying medium, i.e. in a hydrodynamic sliding bearing. Located between the outer rotor and the inner rotor, i.e. between the outer and the inner magnets is the split case 1 with its cylindrical wall 4. The split case 1 is connected with its flange 2 to a pump component 6 or to a coupling component 6, for example, a casing cover and has a closed base 3 opposite thereto. The split case 1 thus separates the conveying medium from the environment in the mounted state and should be leakage-free. The component 6 is hereinafter designated as coupling component 6, pump component 6 and/or as casing cover 6.

The split case 1 can be connected to the pump component 6 by means of a counter-flange 7. The counter-flange 7 has a fastening section 8 and a retaining section 9. The counter-flange 7 is designed, for example, as an L shape in cross-section according to FIG. 1. In the fastening section 8 a through hole is provided in the counter-flange 7. The through hole 8 is penetrated by a screw 10 which can be screwed into a threaded hole 11 in the pump component 6 or in the casing cover 6. In the exemplary embodiment shown in FIGS. 1 and 2, only two screws 10 are shown. Naturally more than two screws 9 can be provided since the counter-flange 7 and also the flange 2 is designed to be annular, which however is known.

The split case 1 according to the invention consists of a sintered ceramic, e.g. of a zirconium oxide ($ZrO_2$). The pump component 6 or the casing cover 6 and the counter-flange 7 are formed from a metallic material. Both exemplary materials (metal/ceramic) naturally have different properties. For example, non-uniform attraction forces could transfer harmful stress transitions and stress peaks to the flange so that this could start to crack, i.e. could be destroyed so that the exemplary magnetic coupling pump could have a leak. Furthermore, both materials have different coefficients of expansion so that a thermally dependent leak is also possible.

The invention starts with a stress-dependent compensation for expansion where a thermally dependent compensation for expansion can also be achieved.

In a first embodiment according to FIG. 1, the flange 2 has an elevation 13 on its fastening side 12. The elevation 13 engages in a corresponding indentation 14 on the counter-flange 7. This is shown in particular in the enlarged detailed view of FIG. 1a.

The elevation 13 is designed to be spherical when viewed in cross-section, therefore has a spherical-segment-like surface 16. The indentation 14 is designed to correspond to this.

It is advantageous that the elevation 13 is preferably disposed centrally on the flange 2 or on its fastening side 12. In a preferred embodiment the elevation 13 is sintered into the flange 2.

The indentation 14 is disposed in the retaining section 9 of the counter-flange 7.

Due to the spherical geometry both of the elevation 13 and of the indentation 14 the attraction forces are distributed uniformly onto the split case 1 or onto the flange 2 thereof so that harmful stress transitions and stress peaks are avoided. In particular a uniform surface loading which is constant over the spherical surface is achieved with the spherical configuration.

Figure 2:
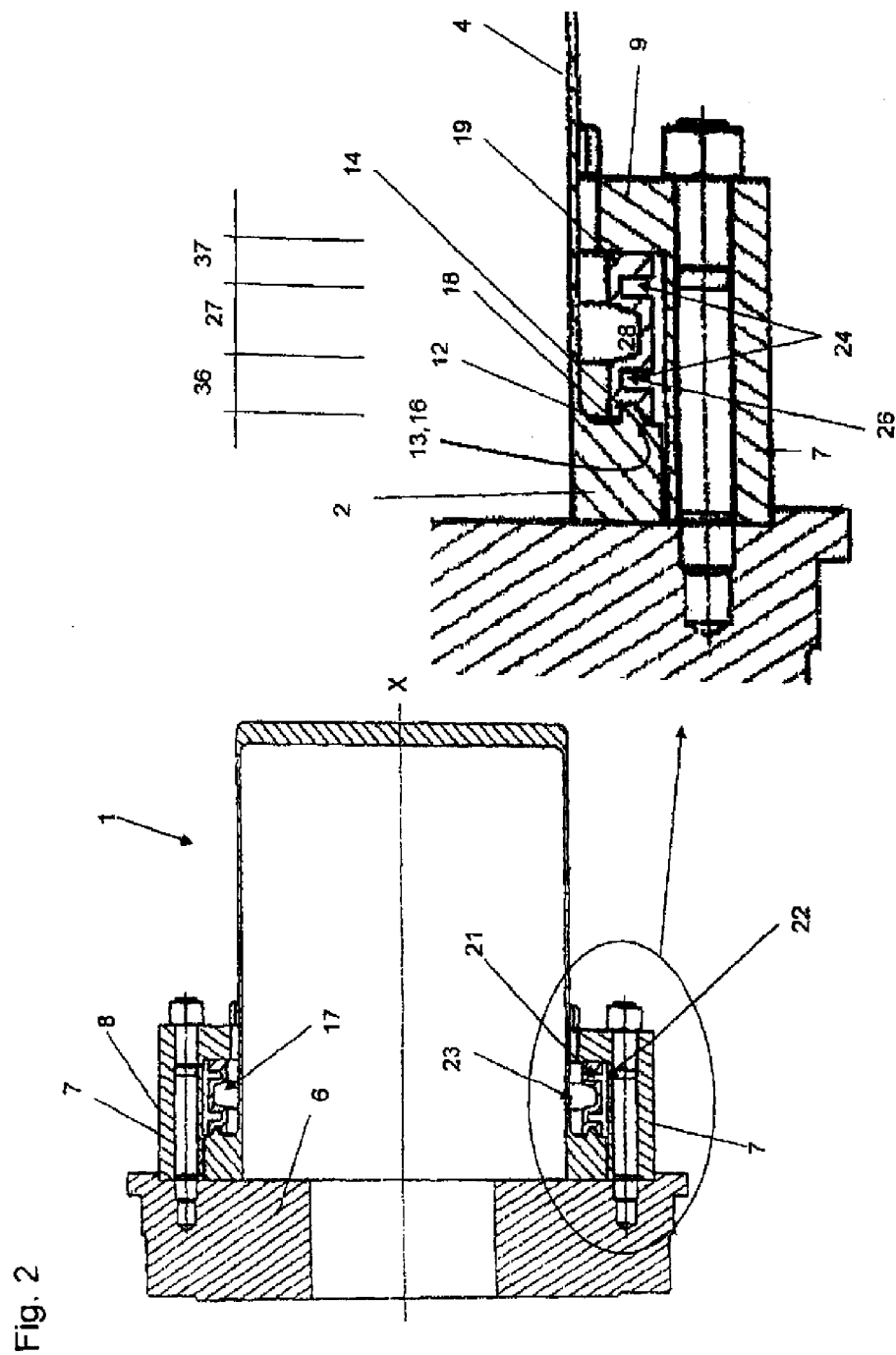
FIG. 2 shows the split case from FIG. 1 in addition to a compensating element between flange and counter-flange.

In the exemplary embodiment shown in FIGS. 2 and 2a, a compensating element 17 is disposed between the flange 2 of the split case 1 and the counter-flange 7. The fastening section 8 of the counter-flange 7 is correspondingly lengthened in relation to the exemplary embodiment to FIG. 1. In a preferred embodiment the compensating element 17 has an indentation 14 corresponding to the elevation 13 on its first front side 18. The second front side 19 opposite thereto abuts flat against the counter-flange 7. It is also feasible to make the first front side 18 abut flat against the flange 2 or its fastening side 12.

The compensating element 17 has a base body 21 which has a first longitudinal side 22 and a second longitudinal side 23 opposite thereto between its front sides 18 and 19. In the mounting position shown according to FIG. 2, the first longitudinal side 22 points in the direction of the counter-flange 7 or the screw 10. The second longitudinal side 23 points in the direction of the wall 4 of the split case 1 or its central axis X.

Slot-like concentric grooves 24 for example are disposed in the first longitudinal side, whose base 26 can be rounded, preferably is flat and which are open to the longitudinal side 22. The concentric grooves 24 are each disposed in the region of the front sides 18 and 19, i.e. in the front side regions 36 and 37 so that, for example, two slot-like concentric grooves 24 are provided. The concentric grooves 24 can also be designated as equatorial concentric grooves 24 which are introduced into the first longitudinal side 22 starting from the inside diameter in the direction of the outside diameter. Between the slot-like concentric grooves 24 there is a central section 27 in which a material recess 28 is disposed in the second longitudinal side 23 opposite the first longitudinal side 22. The material recess 28 when viewed in cross-section is, for example, approximately U-shaped or merely as an example, executed as a truncated cone. Similarly to the concentric grooves 24, the material recess 28 can also be designated as equatorial concentric groove, which however is introduced into the second longitudinal side 23 starting from the outside diameter in the direction of the inside diameter.

A quasi-wave-like compensating element 17 is advantageously formed which can compensate for thermally induced expansions and also for pressure loading where, as a result of the spherical configuration of the at least one front side 18 in cooperation with the spherical elevation 13, harmful stress transitions can be avoided at least in the direction of the flange 2.

It is therefore expedient in the sense of the invention if the compensating element 17 is executed with an indentation 14 corresponding to the spherical elevation 13 at least on its first front side 18 since here again dissimilar material pairs can occur. The flange 2 here consists of a ceramic, whereas the compensating element 17 can consists of a metallic material, i.e. for example of a stainless steel or of a material which is preferably the same as the counter-flange 7. The compensating element 17 can also consist of a stainless steel, e.g. of a high-temperature-resistant stainless steel. Duplex steels or spring steels are also feasible as possible material.

Figure 3:
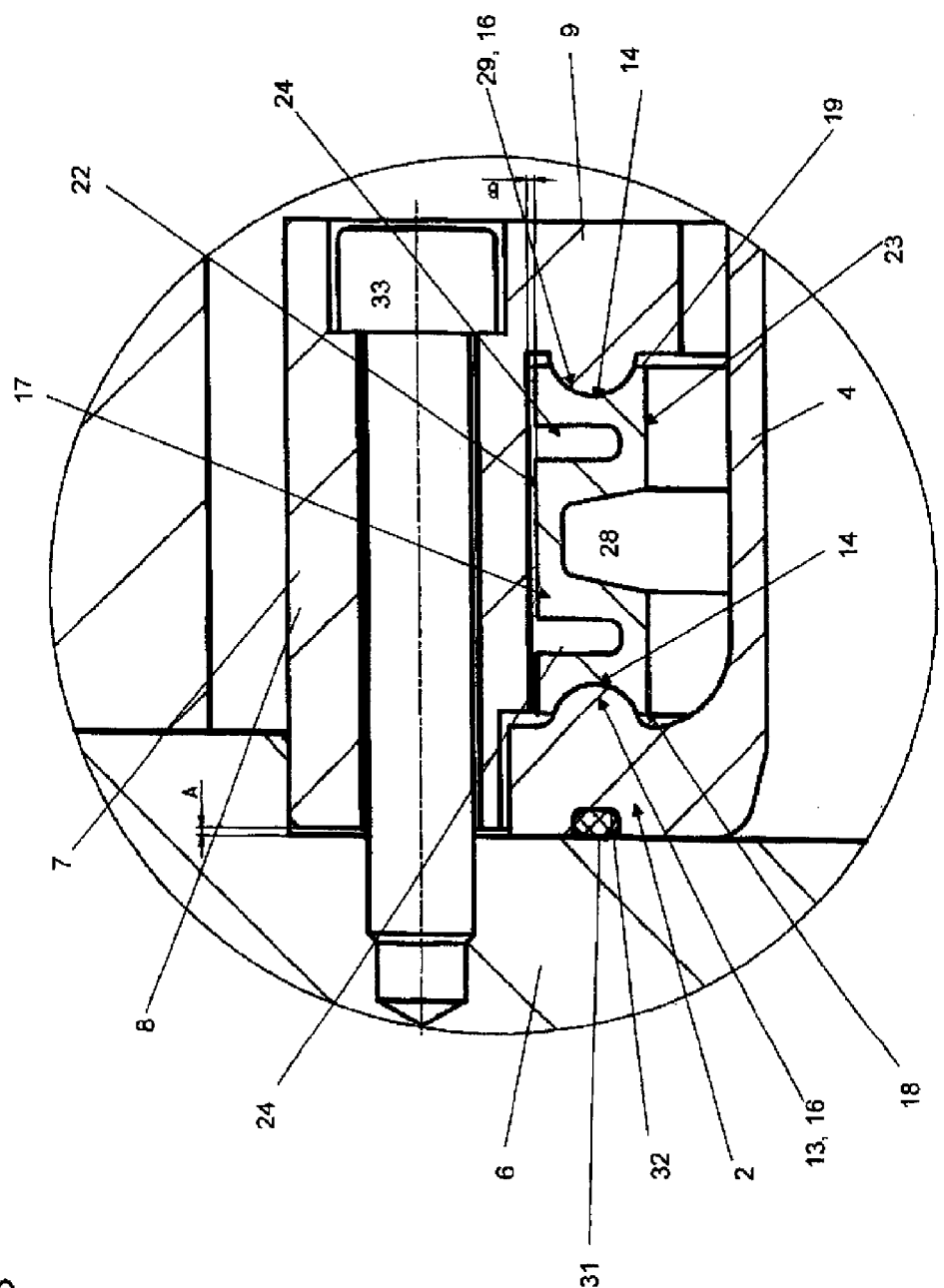
FIG. 3 shows a section of the split case according to FIG. 2 in a pre-assembled position in an enlarged view.
Figure 4:
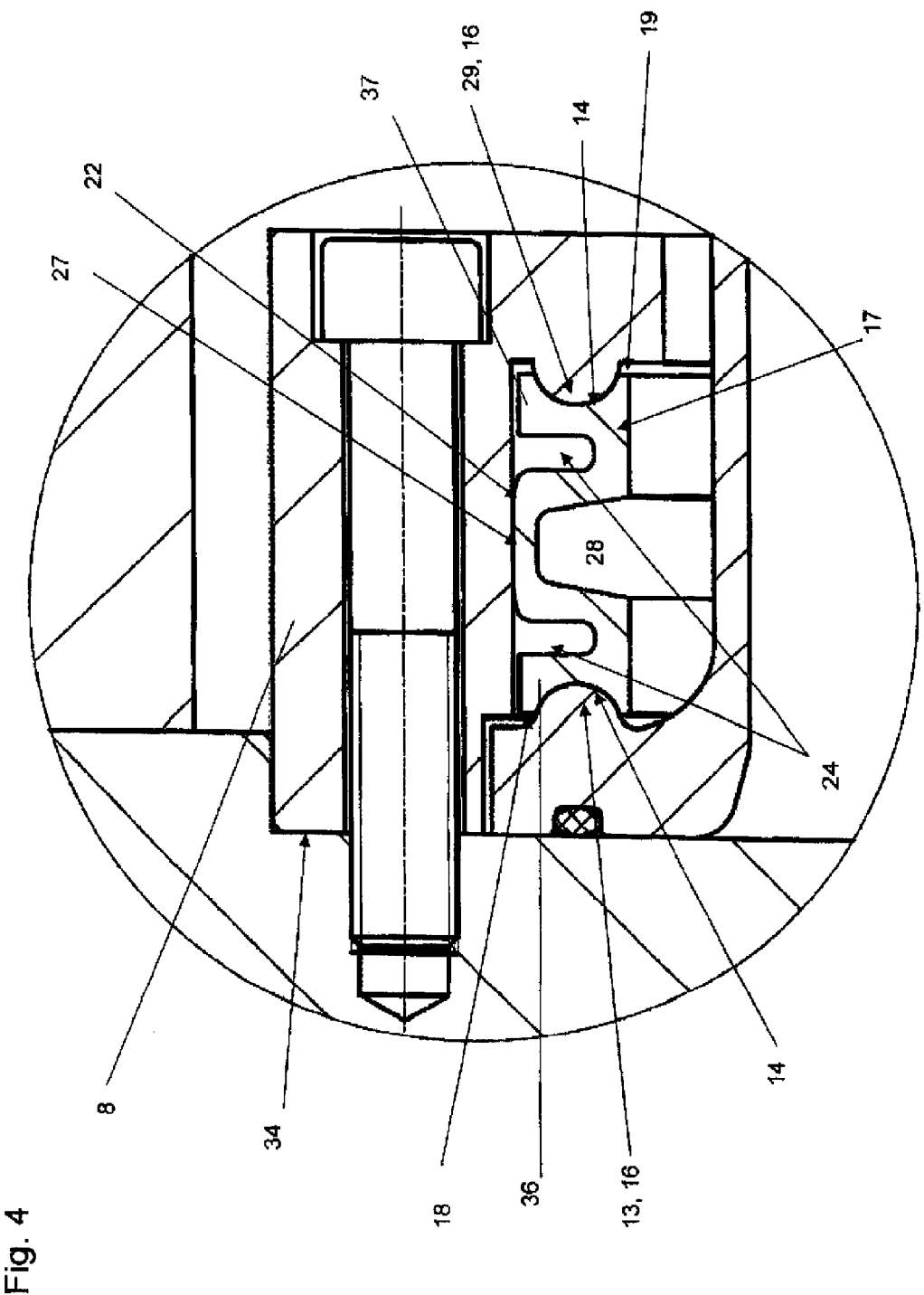
FIG. 4 shows a section of the split case from FIG. 3 in a pre-stressed position in an enlarged view and FIG. 5 shows a section of the split case from FIG. 3 under operating conditions in an enlarged view.
Figure 5:
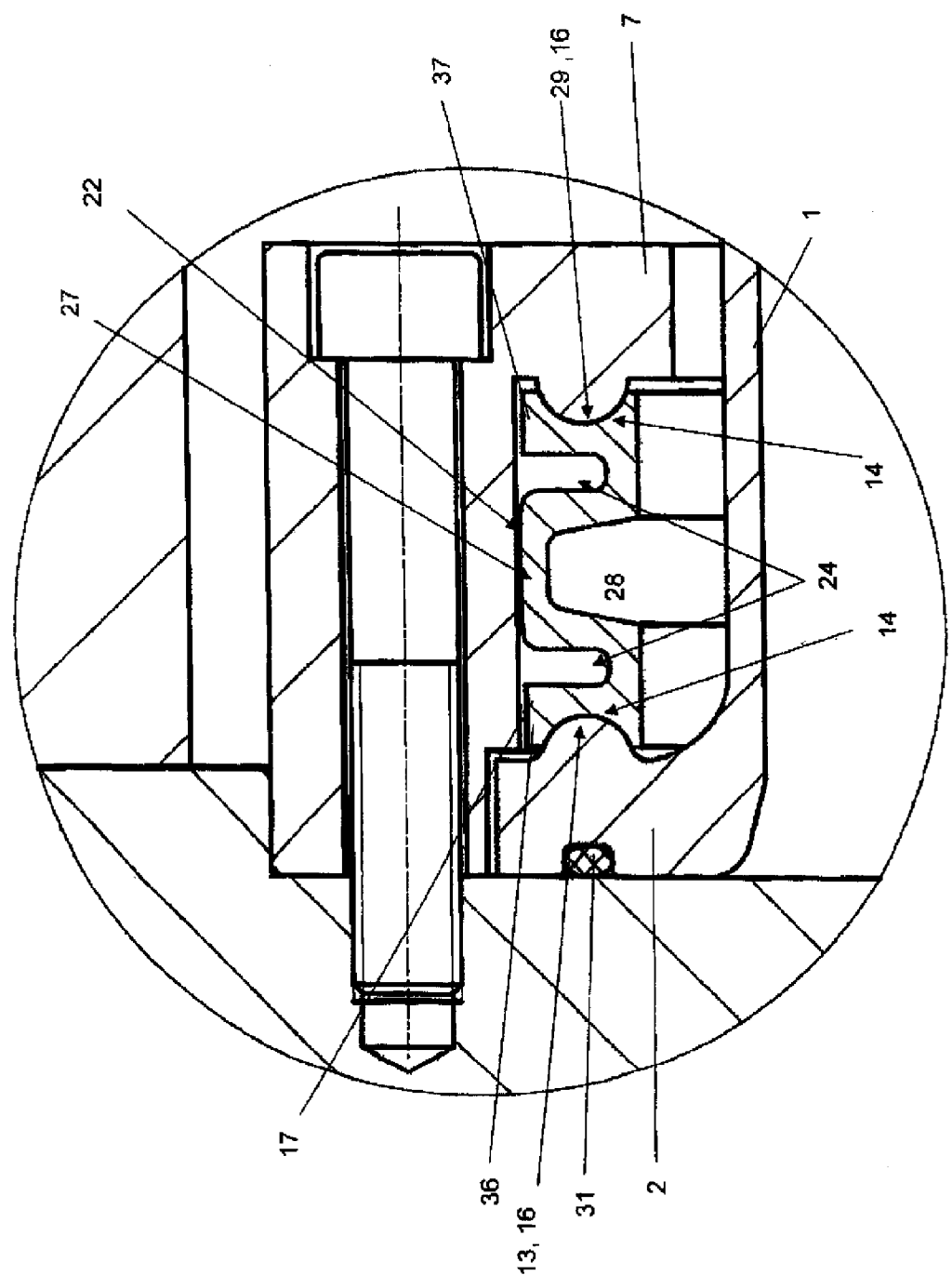

FIGS. 3 to 5 show enlargements of the connection of the flange 2 to the counter-flange 7 with interposed compensating element 17. However, unlike the embodiment shown in FIG. 2, the compensating element 17 has a spherically designed indentation 14 on both front sides 18 and 19, which is why a corresponding elevation 29 is disposed on the counter-flange 7 or on its retaining section 9, which is designed in the same way as the elevation 13 with a spherical surface 16.

FIGS. 3 to 5 show a sealing element 31 which is disposed between the flange 2 and the pump component 6 (coupling component 6) or the casing cover 6. The sealing element 31 can be an O ring or a flat seal which is inserted in a sealing groove 32. The sealing groove 32 is inserted in the flange 2 but can also be incorporated in the component 6 or in the casing cover 6. Such a seal cannot be identified in FIGS. 1 and 2 but can be provided. In addition, FIGS. 3 to 5 show a screw 9 with its screw head 33 countersunk in the counter-flange 7.

FIG. 3 shows a pre-assembled state of the flange 2 on the pump component 6. This can be seen by means of the gap dimension A between the fastening section 8 of the counter-flange 7 and the pump component 6 but also by means of the gap dimension B between the first longitudinal side 22 and the fastening section 8 of the counter-flange 7. In this pre-assembled state screws 10 can be slightly tightened circumferentially without connection partners abutting tightly against one another.

The pre-stressed state is achieved by further tightening of the screws 9, as shown in FIG. 4. The gap dimensions A and B are ZERO which means that the fastening section 8 abuts with its front side 34 against the pump component 6 and the first longitudinal side 22 abuts with the central section 27 against the fastening section 8. The front-side regions 36 and 37 of the first longitudinal side 22 disposed laterally to the central section 27 are not in contact with the fastening section 8. In other words, the compensating element 17 under the pre-stress when viewed in the longitudinal direction as it were, i.e. when viewed in the plane of the drawing in FIG. 4, is tensioned, where the tensioning is maintained dimensionally and functionally even under strong pre-stress due to the flexibility of the geometry.

As a result of the spherical configuration of the elevations 13 and 29 in cooperation with the spherical indentations 14 in the front sides 18 and 19 of the compensating element 17, harmful stress transitions to the ceramic (flange 2) and stress peaks are thus avoided during the pre-stressing.

FIG. 5 shows an operating state. If the pre-stress (FIG. 4) is produced, for example, at a temperature of 20° C., a temperature of, for example, 250° C. can exist under operating conditions which for example is feasible as a result of suitably hot medium. This high temperature now brings about different expansions of the ceramic and the metal components which are compensated by the compensating element 17. As can be seen in FIG. 5, the compensating element 17 is radially and axially deformed in a thermally dependent manner, that is the compensating element 17 expands according to the available heat, where contact of the central section 27 to the fastening section 8 (FIG. 4) is not yet completely cancelled according to FIG. 5. Also the front-side regions 36 and 37 are not in abutting contact. The thermal expansion of the metal counter-flange 7 and also of the pump component 6 is thus compensated by the compensating element 17 without the ceramic split case 1 or its flange 2 being able to suffer damage. This advantageous effect is also supported by the spherical contact partners 13, 14 and 29, 14. In addition, as a result of the thermally induced compensation for expansion, the compensating element 17 has the effect that the pre-stress is maintained unchanged between the flange 2 and the component 6, which means that the seal 31 is not relaxed, thereby avoiding leakages. The compensating element 17 could also be designated as a spring element as it were which compensates for thermal expansions, where pressure loadings can also be compensated.

The invention claimed is:

1. A magnetic coupling, comprising:
   a split case having a flange;
   a coupling component having a counter-flange adapted for fixing the flange on the coupling component, said flange having a fastening side which is oriented towards the counter-flange and has an elevation for engagement in a correspondingly adapted indentation; and
   a compensating element arranged between the flange and the counter-flange and having a first longitudinal side formed with concentric slot-like grooves in front side regions of the compensating element, and a second longitudinal side disposed in opposite relationship to the first longitudinal side and having a material recess provided in a central section of the compensating element and situated between the concentric grooves.

2. The magnetic coupling of claim 1, constructed in the form of a magnetic coupling pump.

3. The magnetic coupling of claim 1, wherein the elevation has a rounded surface.

4. The magnetic coupling of claim 1, wherein the elevation has a spherical surface.

5. The magnetic coupling of claim 1, wherein the elevation is sintered into the fastening side of the flange.

6. The magnetic coupling of claim 1, wherein the counter-flange has a ring-shaped configuration.

7. The magnetic coupling of claim 1, wherein the elevation is disposed continuously on the flange in a circumferential direction.

8. The magnetic coupling of claim 1, wherein the indentation is formed in a flange-confronting end face of the counter-flange.

9. The magnetic coupling of claim 1, wherein the compensating element has at least one longitudinal side formed with a groove or material recess.

10. The magnetic coupling of claim 1, wherein the compensating element has at least one front side provided with an indentation for engagement with the elevation of the flange.

11. The magnetic coupling of claim 1, wherein the compensating element has opposite front sides, each provided with a spherical indentation, with said elevation of the flange engaging in one of the spherical indentations, said counter-flange having an elevation for engagement in the other one of the spherical indentations of the compensating element.

12. A magnetic coupling, comprising:
    a split case having a flange;
    a coupling component having a counter-flange adapted for fixing the flange on the coupling component; and
    a compensating element arranged between the flange and the counter-flange and having a first longitudinal side formed with concentric slot-like grooves in front side regions of the compensating element, and a second longitudinal side disposed in opposite relationship to the first longitudinal side and having a material recess provided in a central section of the compensating element and situated between the concentric grooves.

13. The magnetic coupling of claim 12, wherein the compensating element has at least one flange-proximal front side which is provided with one member selected from the group consisting of an indentation and elevation for engagement of the member with a complementary elevation or indentation of the flange.

* * * * *